No. 863,857. PATENTED AUG. 20, 1907.
W. J. LATCHFORD.
GREEN CORN HUSKING MACHINE.
APPLICATION FILED SEPT. 28, 1906.
5 SHEETS—SHEET 1.
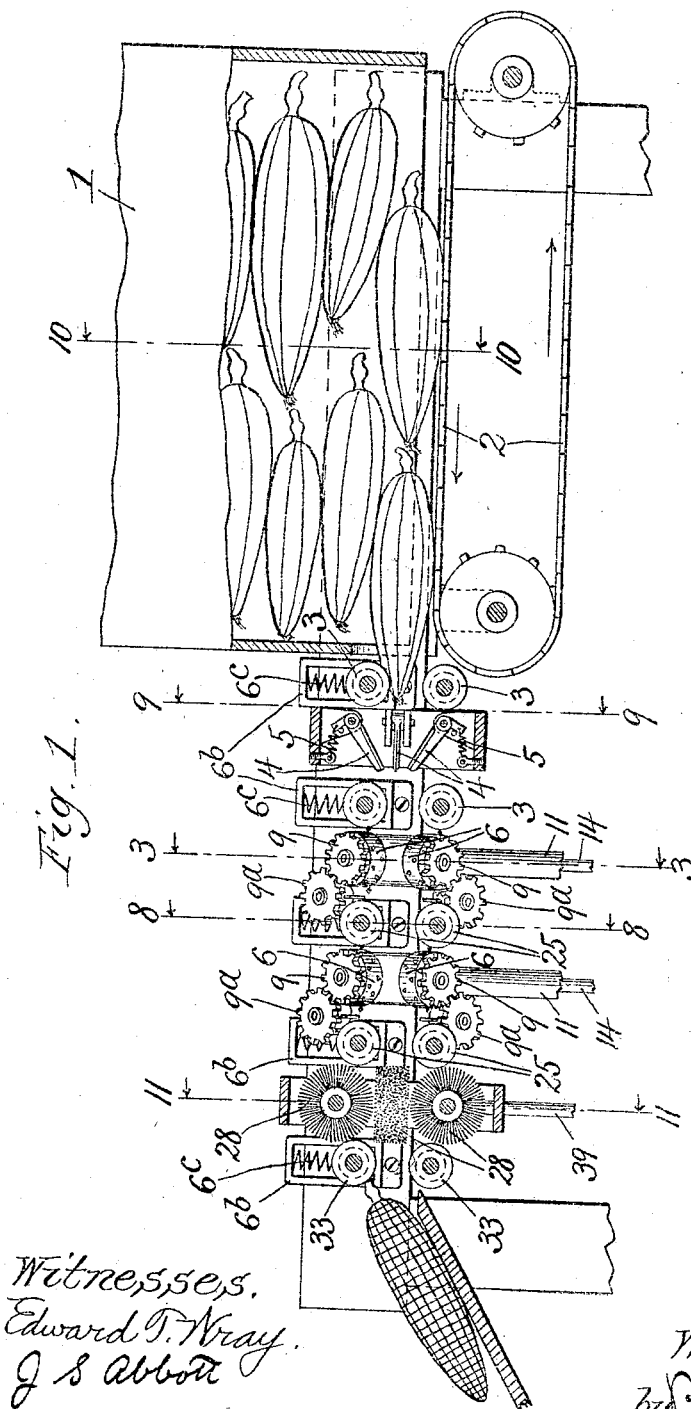
Witnesses,
Edward T. Wray.
J S Abbott
Inventor.
Wm J. Latchford.
by Burton & Burton
his Attys.

No. 863,857.  
PATENTED AUG. 20, 1907.  
W. J. LATCHFORD.  
GREEN CORN HUSKING MACHINE.  
APPLICATION FILED SEPT. 28, 1906.  
5 SHEETS—SHEET 2.
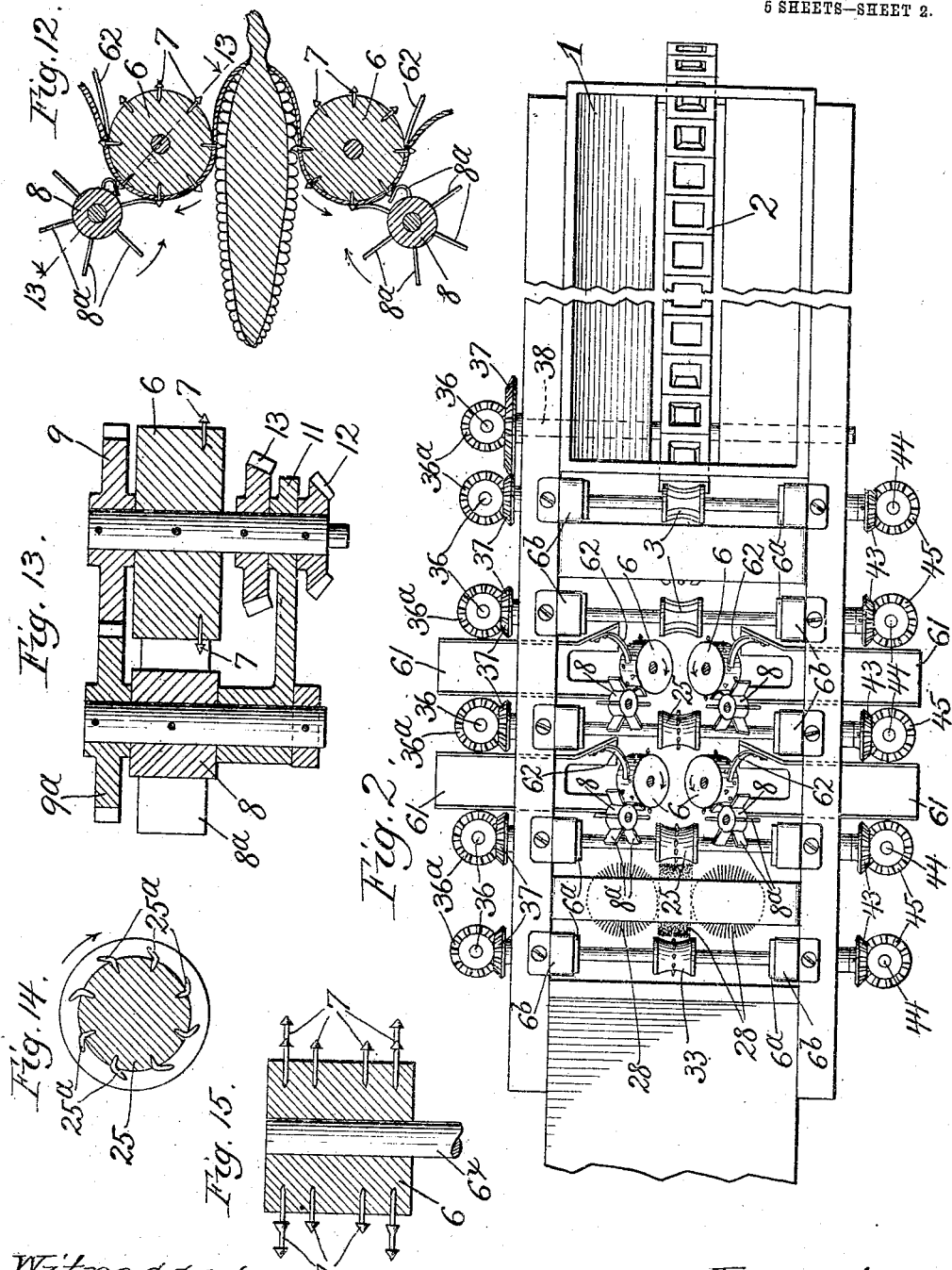
Witnesses.  
Edward T. Wray.  
J S Abbott
Inventor.  
Wm J. Latchford.  
by Burton & Burton  
his Attys.

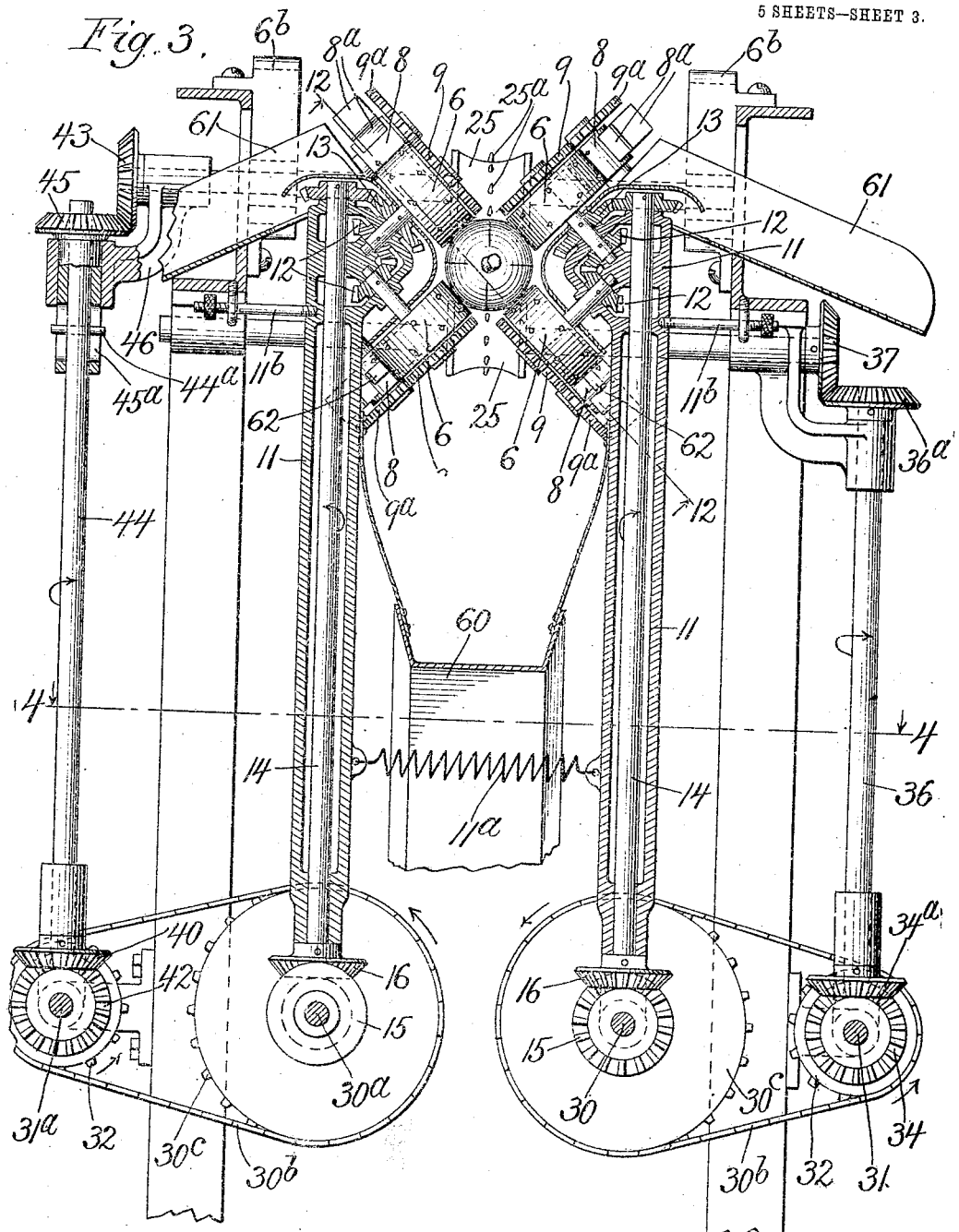

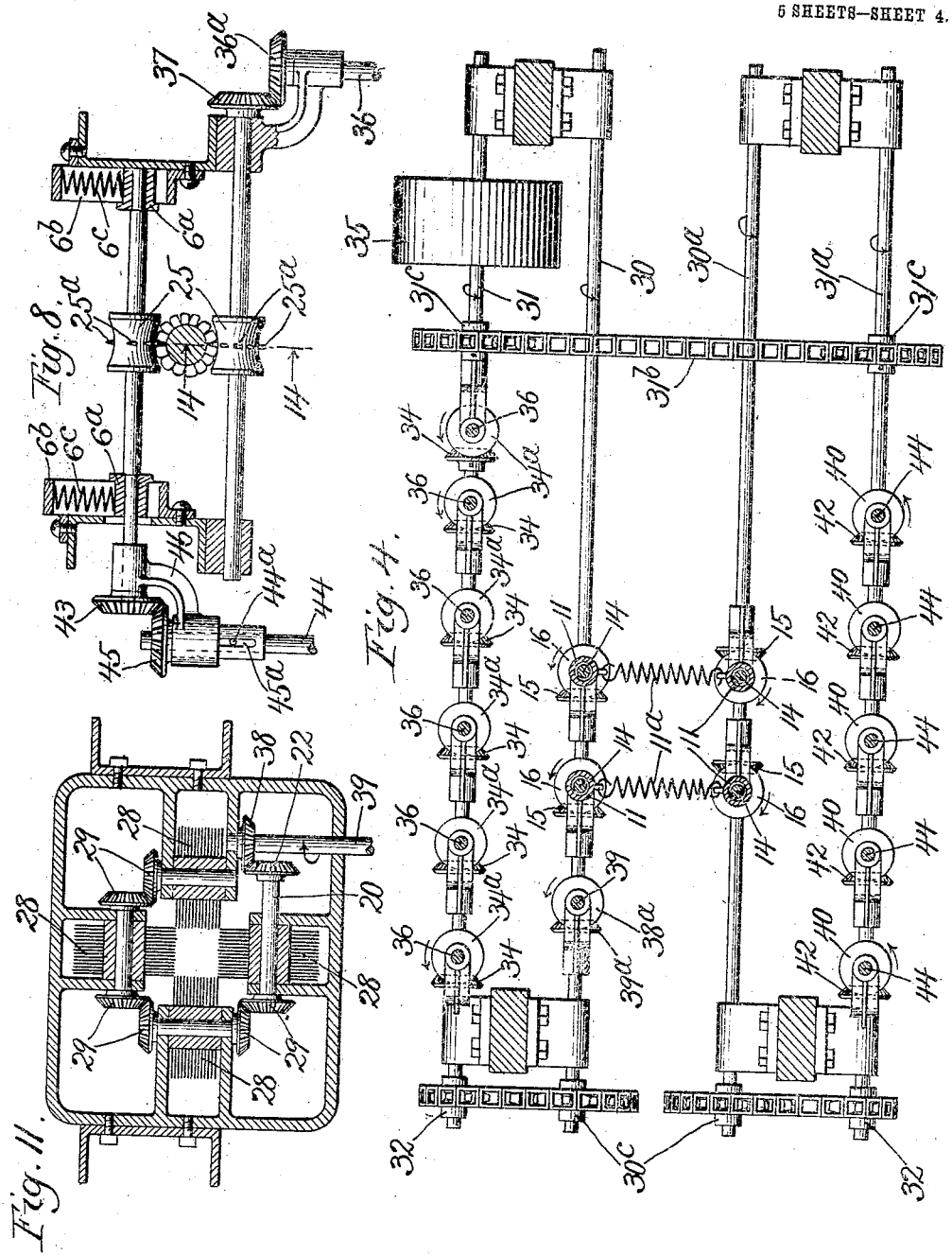

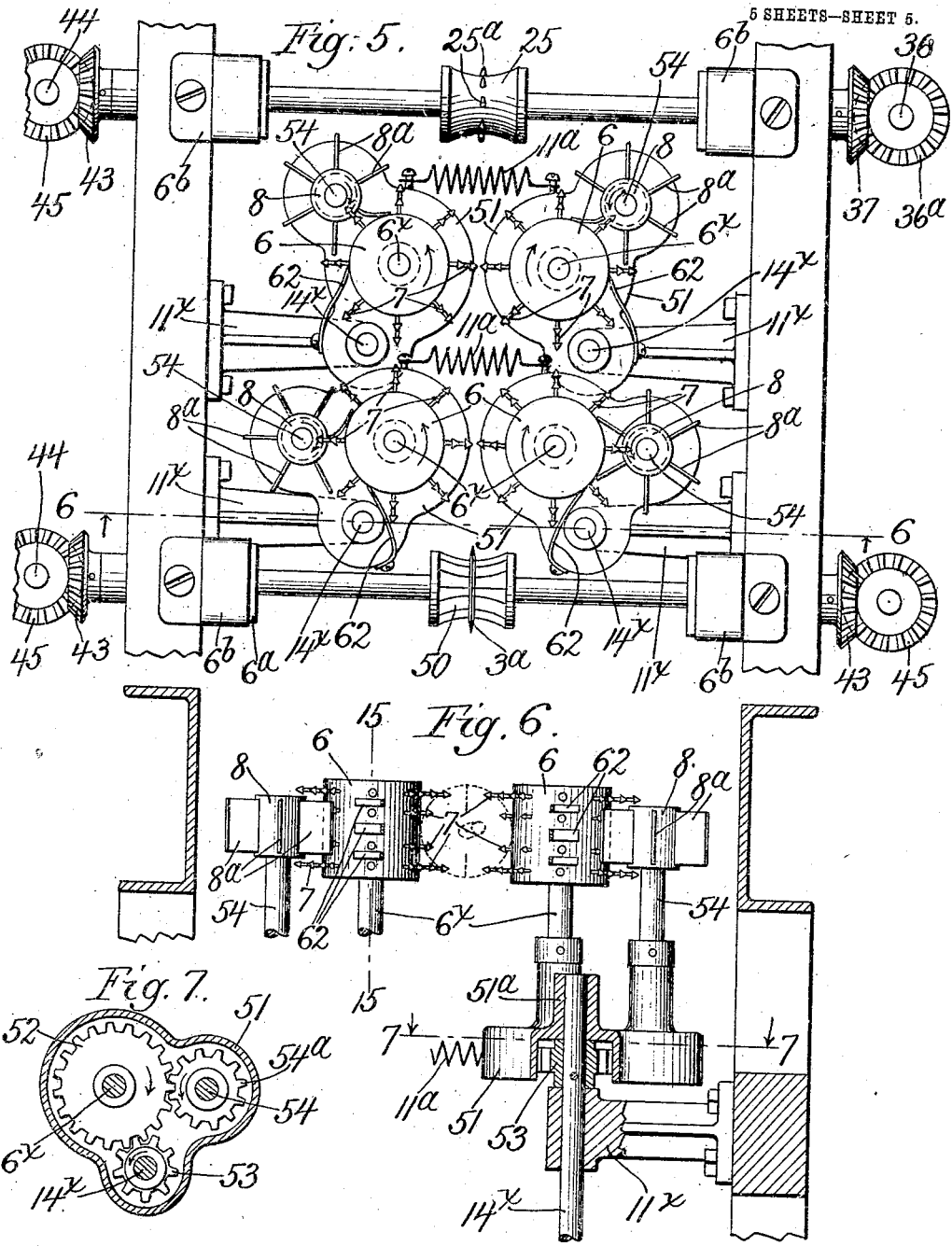

UNITED STATES PATENT OFFICE.

WILLIAM J. LATCHFORD, OF CHICAGO, ILLINOIS.

GREEN-CORN-HUSKING MACHINE.

No. 863,857.  Specification of Letters Patent.  Patented Aug. 20, 1907.

Application filed September 28, 1906. Serial No. 336,539.

*To all whom it may concern:*

Be it known that I, WILLIAM J. LATCHFORD, a citizen of the United States, residing in Chicago, in the county of Cook and State of Illinois, have invented new and useful Improvements in Green-Corn-Husking Machines, of which the following is a specification, reference being had to the accompanying drawings, forming a part thereof.

The purpose of this invention is to provide a mechanism adapted for cleaning the husk and silk from ears of green corn preparatory to further steps in the process of preparing corn for canning.

It comprises mechanism for slitting the husk longitudinally and devices for engaging the sections to fold them back from one end of the ear and thereby strip them off.

It also comprises, as preferably contained in the same organization, suitable means for removing the silk from the ear before it passes beyond the control of the feeding devices, thereby avoiding subsequent or separate handling for that purpose.

It consists also of a specific mechanism shown and described and set out in the claims.

In the drawings:—Figure 1 is a vertical longitudinal section of a machine embodying this invention. Fig. 2 is a partial top plan view of the same, certain parts being removed to disclose the part below, and other parts being broken out to condense the dimensions of the view. Fig. 3 is a section at the line 3—3 on Fig. 1 upon an enlarged scale. Fig. 4 is a section at the line 4—4 on Fig. 3 on the scale of Fig. 1. Fig. 5 is a top plan view of a modified construction of the husk-detaching mechanism. Fig. 6 is a detail section at the line 6—6 on Fig. 5, the gear housing and gears for one of the rolls being broken away. Fig. 7 is a section at the line 7—7 on Fig. 6. Fig. 8 is a detail vertical section, transverse to the ear, at the plane of the axes of a pair of feed rolls, as at the plane 8—8 on Fig. 1. Fig. 9 is a detail section at the line 9—9 on Fig. 1. Fig. 10 is a detail section at the line 10—10 on Fig. 1. Fig. 11 is a detail section at the line 11—11 on Fig. 1. Fig. 12 is a section at the line 12—12 on Fig. 3. Fig. 13 is a section at the line 13—13 on Fig. 12. Fig. 14 is an enlarged detail section of one of the feed rolls, at the line 14—14 on Fig. 8. Fig. 15 is a detail section of one of the husking rolls, as at the line 15—15 on Fig. 6.

The ears of corn to be husked are delivered sidewise into a hopper, 1, whose discharge mouth is wide enough to deliver only one ear at a time at any one point of its length, but which may be long enough to accommodate a number of ears laid end to end in the hopper and thereby delivered in a row lying endwise behind each other. The hopper overhangs an endless conveyer, 2, whose direction of travel is longitudinal of the discharge mount of the hopper, and which receives the ears as they are delivered to the hopper for advancing them to feed rollers, 3, 3, by which they are propelled into the path of the devices for husking. The ears are delivered into the hopper and taken by the conveyer, point foremost. The first process or action to which the ear is subjected is the longitudinal slitting of the husk, which is performed either by disk cutters, 3ª, in the feed rolls, as shown in Fig. 5, or by a plurality of knives, 4, 4, 4, 4.

A less or greater number of knives may be employed with corresponding modification in the subsequent devices. In Figs. 1 and 9 there are shown four knives to quarter the husk by longitudinal slitting. In this form of the invention, each of the knives, 4, is pivotally mounted on the frame so as to project forward obliquely, the knives converging in their forward oblique trend toward the axis of the ear, and being pressed thereon by a spring, 5, for each knife, the knives operate with a draw cut and yielding pressure upon the husk, and being suitably sharp they slit it from end to end as the ear is fed through between them. Beyond the cutting devices, whether they be the disks, 3ª, of Fig. 5, or the knives, there are located the devices for stripping the husk. These devices comprise a barbed roller or wheel, 6, for each of the sections into which the husk is slitted, such wheels being mounted two and two opposed to each other,—that is, at opposite sides of the ear,—and revolving with their sides next the ear moving forward in the direction of advance of the ear; and the mechanism for rotating them is geared so as to give them at their periphery, as nearly as may be calculated, a speed equal to the speed of travel of the ear as it is advanced by the feed rollers, some allowance being made for slipping. Each of these rollers or wheels, 6, has projecting from its periphery barbed pins or studs, 7, 7. An entirely satisfactory form of these pins is made from a round rod terminating in a large conical head having an abrupt flat annular shoulder back of the head making a barb. Two such barb-enlargements may be formed on each pin if desired, and this is desirable for very heavy husks and for the outer row of barbs in certain of the forms of the rolls hereinafter described. Preferably, these barbed pins are distributed in a plurality of circumferential rows or series around each wheel, the outer rows operating only on large ears or heavy husks.

The pins of adjacent rows or series are preferably distributed so as to produce a staggered arrangement,—that is to say, each barb in one series being opposite the interval between the two barbs of the adjacent series. This arrangement adapts the devices to strip off the husks of large ears of which the section should be quite wide, as effectually as it will strip the narrower sections of smaller ears; but the single row or circumferential series of barbs is satisfactorily efficient in most cases. To increase the adaptation of these husk-stripping devices to assist in the longitudinal propulsion of the ear, relieving the feed rollers and preventing the necessity tor causing them to grip the ears so tightly as might otherwise be necessary, I have in some cases provided, coöperating with each of the barbed rollers, and geared thereto by intermeshing gears, 9, 9ª, a winged roller, 8, the wings, 8ª, being flexible and for that purpose being conveniently made of rubber packing or like material, so that having by their projection from the roll engaged the loose ends of the husk beyond the point at which the first barb penetrates it, the wing will fold while carrying the husk in between the two rolls, and thus wrapping and pressing it yeildingly on to the barbed roll will prevent the husk from escaping from the barbs and will cause it, held snugly on to the barbed roller, to serve as a means by which the rotation of the roll will draw the ear somewhat in the direction which it requires to be fed, thus assisting the feed rollers and diminishing the need for pressure of the latter to grasp the ear.

In the construction shown in Figs. 1, 3 and 9 I have shown four husk-stripping rolls and four slitting knives, the husk being quartered and each quarter engaged by a separate roll for stripping it off. For driving the four barbed rolls and adapting them to accommodate themselves to ears of different diameter, they are geared together in pairs, two of each pair having their axes at right angles to each other so as to present their barbed peripheries toward the axis of the ear at points ninety degrees separated around said axis; and the two rolls of each pair thus geared together, with their connecting gearing, are mounted upon a gearing frame, 11, which is mounted to move toward and from the axis of the ear, the direction of such movement being that of a plane which substantially bisects the angle of divergence between the axes of the two rolls of the pair. Both pairs of rolls and their respective connecting gears being thus movably mounted are yieldingly pressed toward each other and toward the axis of the ear, as hereinafter described. For gearing together the two barbed rolls of each pair, their shafts are provided with intermeshing miter gears, 12, 12, and on the shaft of the upper of the two rolls there is another beveled gear, 13, which meshes with an upstanding shaft, 14, which is also journaled in the gearing frame, 11. This gearing frame at its lower end is pivotally mounted on a longitudinal shaft at the lower part of the machine frame, two such longitudinal shafts being provided, one upon each side of the vertical plane of the path of the ear, driven as hereinafter more particularly described; and the gearing frames, 11, at one side are pivoted on one of these shafts, 30, while the identically constructed gearing frame at the other side is pivoted on the other shaft, 30ª. A beveled gear, 15, on the longitudinal shaft meshes with the beveled gear, 16, at the lower end of the vertical shaft, 14, for communicating power from the longitudinal shaft to the husk-stripping rolls at the upper end of the pivoted gearing frame, 11. A spring, 11ª, connects the two gearing frames, 11, for drawing them toward each other to press the husk-stripping rolls they respectively carry inward against the ear and to yield for admitting the ear and accommodating ears of different diameter. Adjustable stop bolts, 11ᵇ, set into the frame of the machine serve to limit the approach of the gearing frames, 11, 11, under the action of the spring.

The two vertical shafts, 14, 14, are rotated in opposite directions, their beveled gears, 16, being at opposite sides of their respective driving beveled gears, 15, 15, on the parallel shafts, 30, 30ª, which are rotated in the same direction by chains, 30ᵇ, 30ᵇ, connecting their respective sprocket wheels, 30ᶜ, with the sprocket wheels, 32, on the parallel shafts, 31, 31ª, which are journaled outside the frame structure for carrying the feed-roll-driving gears, as hereinafter described.

Immediately beyond the system of barbed rolls described, there are preferably mounted a second pair of feed rolls, 25, 25, for engaging the ear after the husk is stripped therefrom. These rolls, for the purpose of such engagement without danger of mashing the grains, are provided with slender sharp-pointed teeth, 25ª, which trend back with respect to the direction of rotation of the rolls for engagement with the ear, so that they may withdraw from the grains or cob in so far as they penetrate them, without plowing up and mutilating or shelling the corn. These teeth are preferably short as well as slender, their grasp or engagement of the ear being designedly to supplement a moderate pressure which the rolls exert upon the ear for feeding it. Immediately beyond this pair of feeding rolls there is preferably located a second set of husk-stripping rolls which are of the same construction and are geared and mounted for operation and are driven in precisely the same manner as the first set,—namely, from beveled gears, 15, 15, on the horizontal shafts, 30, 30ª, and the corresponding parts,—rolls, gears, shafts and pivoted frame,—are similarly lettered. Beyond this second set of barbed rolls, there preferably is located a third pair of feed rolls constructed and operated precisely like the feed rolls, 25, above described, and denoted by the same letters. Beyond these feed rolls there is located a set of brushes, 28, for stripping off the silk which may remain after the husk is stripped away. These brushes are four in number, grouped about the axis of the ear and geared together by beveled gears, 29, on their respective shafts. The first transverse shaft, 20, of the train or series pertaining to these four brushes derives power by means of a beveled gear, 22, thereon, meshing with a beveled gear, 38, on the upper end of a vertical shaft, 39, which has at the lower end a beveled gear, 38ª, meshing with a beveled gear, 39ª, on the shaft, 30. Emerging from between these brushes, the ears are received between two final feed rolls, 33, 33, by which they are delivered from the machine into any proper receptacle or conveyer not shown.

For driving the feed rolls and their devices already described, the longitudinal shafts, 31, 31ª, above mentioned, are provided, said shafts being journaled on the frame of the machine outside the standards at the lower part and connected for rotation in the same direction by chain, 31ᵇ, passing about sprocket wheels, 31ᶜ, 31ᶜ. Power is communicated to the shaft, 31, by a belt over a pulley, 35, on said shaft. Intermeshing beveled gears, 34, on the shaft, 31, and 34ª, on each of the vertical shafts, 36, rotate the latter, which transmit rotation by beveled gears, 36ª, at their upper ends to intermeshing beveled gears, 37, on the lower feed roll shafts, respectively, and on the conveyer driving roll shaft, 38, for rotating said several roll shafts to actuate the lower feed rolls and the conveyer, 2.

The bearings of all the upper feed rolls are mounted for yielding away,—that is, upward,—from the lower feed rolls to accommodate ears of different diameter, the journal boxes, 6ª, of said upper rolls being for that purpose mounted in vertical guide-ways, 6ᵇ, on the frame, and yieldingly pressed downward by springs, 6ᶜ, operating above them in a manner requiring no more specific explanation. For driving the upper feed rolls and permitting them to rise and fall as required to accommodate ears of different sizes, vertical shafts, 44, are journaled on the frame of the machine, having at their lower ends beveled gears, 40, meshing with the gears, 42, on the shaft, 31ª, and at their upper ends beveled gears, 45, meshing with beveled gears, 43, on the ends of the shaft of said upper rolls, a yoke, 46, being provided having the bearing at that end of said upper roll and having the beveled gear, 45, journaled in it for meshing with the beveled gear, 43, on the roll shaft.
The upper end of the shaft, 44, has a cross pin, 44ª, which engages a slot, 45ª, in the hub of the beveled gear, 45, for driving the latter; the shaft itself being loosely fitted in the hub so as to prevent any cramping in case the upper rolls when crowded away from the lower by a large ear should not lift equally at the two ends. This description applies equally to all the pairs of feed rolls, the same letters being used to designate the corresponding parts in them all.

When the four husking rolls are employed, located as in Fig. 3, the husks stripped by the two lower rolls are delivered downward between said two rolls and are directed and gathered by a hopper-mouthed chute, 60, for discharge between the shafts, 30 and 30ª. In this type of construction, the husks stripped by the upper rolls are deflected over the housing of the beveled gear train for driving the two rolls of each pair into lateral chutes, 61, 61, and are discharged thereby outside the row of vertical shafts which transmit motion to the feed rolls.

I find it entirely practicable to strip the husks by means of the barbed rolls described without dividing the husks into more than two sections, and this is usually preferable by reason of the simplicity of the structure and reduction in cost of the machine which may be effected by reducing the number of husk rolls to two. This, of course, also similarly reduces the number of cutters necessary for slitting the husk, and when only two cutters are to be employed, it is practicable to use for this purpose a rotating disk which may be formed on or with the feed rolls of the pair immediately preceding the husking rolls; and this construction also dispenses with one pair of feed rolls, as may be clearly understood upon inspection of Fig. 1, wherein it appears that when the pivoted knives are employed for slitting, they are preceded by a pair of feed rolls; and the omission of the knives, their function being performed by cutting disks in the feed rolls immediately before the husking rolls, makes it possible to set the conveyer, 2, in position to deliver directly to these last-mentioned feed rolls. In Figs. 5 and 6, construction of this character is shown in detail. This plan view shows a feed roll, 50, having a cutting disk, 3ª, midway in its length. In this construction, instead of the vertical shafts, 14, mounted in gearing frames, 11, pivoted and swinging about their horizontal driving shafts, similar vertical shafts, 14ˣ, having at their lower ends beveled gears, 16, meshing with beveled gears, 15, on the horizontal shaft as in the other construction, are journaled at their upper end in fixed bearing brackets, 11ˣ, and the husking roll, 6, has its shaft, 6ˣ, journaled in a bearing bracket and housing, 51, which is mounted for swinging upon the upper end of the shaft, 14ˣ, a gear, 52, on the lower end of the shaft, 6ˣ, being meshed with the pinion, 53, on the shaft, 14ˣ, between its bearing in the bracket, 11ˣ, and the bearing, 51ª, of the housing upon it, and by this construction the husking roll, 6, is rotated by the shaft, 14ˣ, while free to swing about that shaft in order that the two opposed rolls may accommodate themselves in respect to their spread to the size of ear which is being operated upon between them. In this construction, the flexible-vaned rollers, 8, are carried upon short shafts, 54, which are also journaled in the housing bearing, 51, and rotated by the engagement of the gears, 54ª, at the lower ends of said shaft with the gear, 52, on the husking roll shaft within the housing. The housing swinging about the shaft, 14ˣ, carries with it both the husking rolls and the flexible vaned rolls, 8, retained in unchanged relation to each other throughout the swinging movement. In this construction, the husk strippers, 62, are attached to the housing as shown in Figs. 5 and 6. In this construction, the spring, 11ª, which in the first described construction connects the pivoted bearing frames, 11, connects the two housings, 51, for the two opposed rolls, with the same effect,—to wit, yieldingly drawing the two opposed rolls toward each other and permitting them to spread to accommodate different sized gears.

In either of the two constructions shown, the feed rolls between the two groups of husking rolls (whether each group consists of two rolls or of four rolls) may be omitted. In Fig. 5, repesenting the construction having only two husking rolls in each group, these intermediate feed rolls are not shown. This omission may be understood as applicable to either construction; and also it may be understood that the intermediate feed rolls might be employed in the second construction if desired, the interval between the two pairs of husking rolls being sufficient to accommodate.

It will be understood that the husking rolls are adapted to grip the ear for feeding it, as well as to engage its husks by the barbs; and it will be seen also that the engagement of the barbs with the husks very materially assists the feeding action and without illustration of any specific structure having no other feeding means, it may be understood that the husking rolls might be depended upon entirely for feeding the rolls through between themselves, while they are operating also by their barbs to strip the husk.

I claim:—

1. A corn-husking machine comprising rolls adapted to grip the ears between them for feeding the ears longitudinally, such rolls having peripheral barbs for engaging the husks; means for slitting the husks longitudinally between the rolls in the longitudinal movement of the ears, and ear-feeding devices which engage the ears beyond the husk-stripping devices.

2. A corn-husking machine comprising rolls adapted to grip the ears for feeding them longitudinally, having peripheral barbs for engaging the husk; means for slitting the husks longitudinally between the rolls in the longitudinal movement of the ears, and means for stripping the husk from the rolls.

3. In a machine for the purpose indicated, in combination with means for advancing the ears longitudinally, a peripherally barbed device and means for holding it pressed toward the ear to engage the husks for rotating it in the direction of advance of the ear at the side there-toward.

4. In a machine for the purpose indicated, in combination with means for advancing the ears longitudinally, peripherally barbed devices opposed at opposite sides of the ear, and means for holding them pressed toward the ear and for rotating them in the direction of advance of the ear at their sides there-toward.

5. A corn-husking machine comprising, in combination with means for advancing the ears longitudinally, means for slitting the husks longitudinally, and barbed devices rolling against the respective sections of the slitted husk for detaching the latter from the ear.

6. In a corn-husking machine, in combination with means for advancing the ears longitudinally, means for slitting the husks longitudinally; peripherally barbed devices mounted for rotation at planes to engage their barbs with the respective sections of the slitted husks, and means for holding such barbed devices pressed toward the ear and for rotating them in the direction of advance of the ear at their sides there-toward.

7. In a machine for the purpose indicated, in combination with means for advancing the ears longitudinally, a plurality of peripherally barbed devices grouped around the path of the ear, mounted for rotation in planes substantially radial to the axis of said path; means for holding the barbed devices yieldingly pressed toward the ear, and means for revolving them in the direction of advance of the ear at the sides there-toward.

8. In a corn-husking machine, in combination with means for advancing the ears longitudinally, peripherally barbed rolls opposed at opposite sides of the ear; means for holding them pressed toward the ear and for rotating them in the direction of advance of the ear at their sides there-toward to cause their barbs to engage the husk and strip the same from the ear, and means for stripping the husks from the rolls.

9. In a corn-husking machine, in combination with means for advancing the ears longitudinally; cutters mounted for slitting the husks longitudinally; peripherally barbed rolls mounted for rotation against the ear and adapted to grip the ear between them at positions alternating with the slits, and means for holding such rolls pressed toward the ear for rotating them in the direction of the advance of the ear at their sides there-toward.

10. In a machine for the purpose indicated, in combination with an endless conveyer for receiving the ears, a hopper having a discharge mouth which extends longitudinally with respect to the conveyer overhanging the same, said mouth being limited in width to prevent the delivery of ears side by side; rolls adapted to grip the ears for feeding them longitudinally between which they are received after passing off the endless conveyer, said rolls having peripheral barbs for engaging the husk, and means for slitting the husk longitudinally between the rolls in the longitudinal movement of the ears.

11. A corn-husking machine comprising peripherally barbed rolls and means for holding them pressed toward the ear for engaging the husk for stripping it from there-against to strip the husk from the ear, in combination with means for stripping the husk from the barbed rolls.

12. In a corn-husking machine, in combination with peripherally barbed devices rotating against the ears to engage their barbs with the husk for stripping it from the ears; a roll having flexible radial wings or vanes revolved in time with each of the peripherally-barbed husk-stripping devices near enough to the periphery of the latter to cause the vanes or wings to be folded in passing the barbed devices, and means for stripping the husk from the barbed devices beyond such flexibly winged rolls.

13. A corn-husking machine comprising peripherally barbed rolls mounted for rotation against the ears; bearings in which they are journaled mounted for movement toward and from the path of the ear, and means which yieldingly press such bearings toward such path.

14. A corn-husking machine comprising peripherally barbed rolls mounted for rotation against the ears; rotating shafts from which the rolls respectively derive motion; a bearing frame for each roll pivoted about the axis of its said driving shaft, and a spring operating on such bearing frame for pressing the roll bearing toward the ear.

15. A corn-husking machine comprising opposed peripherally barbed rolls mounted for rotation against opposite sides of the ear; shafts in which the rolls respectively derive motion; bearing frames in which the rolls respectively are mounted, pivoted respectively about the axes of said shafts, and a spring connecting the two bearing frames for drawing them yieldingly toward each other.

16. A corn-husking machine comprising a peripherally barbed roll mounted for rotation against the ears; a driving shaft for such roll; a bearing frame in which the shaft of the husking roll is journaled pivoted about the axis of such driving shaft; a husk-engaging roll coöperating with the barbed roll to hold the husks on the latter, having its shaft journaled in the same bearing frame; gears connecting said three shafts, and a spring operating on the bearing frame tending to yieldingly urge it in direction to press the husking roll toward the ears.

17. A husking machine comprising a peripherally barbed roll mounted for rotation against the ears; a driving shaft for such roll; a bearing frame for the roll pivoted about the axis of such driving shaft; a husk-engaging roll coöperating with the barbed roll to hold the husks on the latter, having its shaft journaled in the same frame, and gears connecting said three shafts, the bearing frame being formed as a housing for all the gears.

18. A corn-husking machine comprising a pair of peripherally barbed rolls mounted for rotation against the opposite sides of the ear; feed rolls for advancing the ear longitudinally between such barbed rolls, and husk-slitting disks mounted for rotation with the feed rolls respectively, said feed rolls and said barbed rolls being mounted for rotation in radial planes which alternate with each other around the axis of the ear.

19. A corn-husking machine comprising a pair of peripherally barbed rolls mounted for rotation about vertical axes at opposite sides of the ear; feed rolls mounted for rotation about horizontal axes above and below the ear, and cutters for slitting the husks longitudinally at opposite sides at a plane between the barbed rolls.

20. A corn-husking machine comprising a peripherally barbed roll mounted for rotation against the ears; a husk-engaging roll coöperating with the barbed roll to hold the husks on the latter; means for pressing the husk-engaging roll toward the barbed roll and a stripper engaging the husk to strip it from the barbed roll beyond the husk-engaging roll.

21. A corn-husking machine comprising a peripherally barbed roll mounted for rotation against the ears; a coöperating husk-engaging roll spring-pressed toward the barbed roll and a stripper for taking the husk off the barbed roll beyond the spring-pressed roll.

22. A corn-husking machine comprising a peripherally barbed roll mounted for rotation against the ears to strip the husk therefrom; a coöperating husk-engaging roll between which and the barbed roll the husk is engaged; two rolls rotating in the same direction at their proximate husk-engaging sides, and a stripping device operating at the delivery side of the two rolls.

In testimony whereof, I have hereunto set my hand, at Chicago, Illinois, this 26 day of September, 1906.

WILLIAM J. LATCHFORD.

Witnesses:
EDWARD T. WRAY,
J. S. ABBOTT.